Dec. 25, 1934.  A. R. DE WAHL  1,985,535

ENDLESS CONVEYER

Filed Aug. 27, 1934

Inventor:
Arvid R. DeWahl.
By
Attorney

Patented Dec. 25, 1934

1,985,535

UNITED STATES PATENT OFFICE 1,985,535

ENDLESS CONVEYER

Arvid R. De Wahl, Minneapolis, Minn.

Application August 27, 1934, Serial No. 741,588

4 Claims. (Cl. 198—193)

This invention relates to endless conveyers, and the primary object is to provide a simple, efficient, and practical construction of conveyer element that is particularly designed for use in connection with elevating mechanisms of potato diggers, pickers, and similar types of machinery wherein potatoes, beets, or other roots, fruits, etc., are carried from one location to another. More specifically the object is to provide a conveyer structure that will embody all of the advantages found in conventional structures now commonly in use, but which will be so formed that it will overcome the serious objection, in such structures, which is that the connectable sections thereof have exposed ends or edges that are sufficiently sharp that they mar or mutilate, and thus substantially reduce the food quality and market value of such products. A further object is to so design the conveyer that the sections or links thereof can be quickly and easily attached and detached, so that the endless conveyer, as such, can be readily shortened or lengthened, and so that new links can be substituted for worn or broken ones, for in machines such as potato harvesters, where sand and grit is constantly contended with the conveyer parts are subject to constant wear and the replacement of conveyer links or sections is not infrequently occasioned. On the other hand, while quick and convenient detachability of the conveyer sections or links is an important factor, it is also to be noted that the construction must be such as to preclude accidental disconnection to which conveyers of this type have a decided tendency, particularly in the under run where there must necessarily be a certain amount of slack. The links must also be of the spaced or open type wherein as the tubers or other crop products are to be carried the spaces will be so arranged as to provide for the discharge therethrough of vines, stems, leaves, dirt, and other undesirable foreign matter.

In the accompanying drawing, which illustrates a preferred embodiment of the invention—

Figure 1:
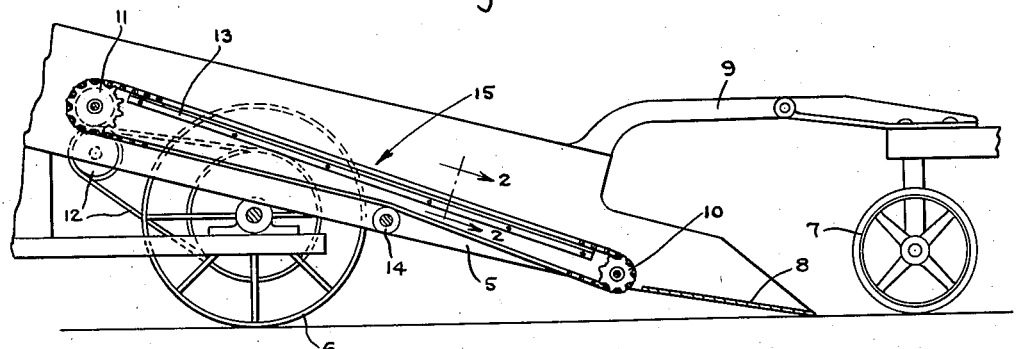
Fig. 1 is a sectional elevation taken longitudinally through a potato harvester in which my improved conveyer is incorporated.
Figure 2:
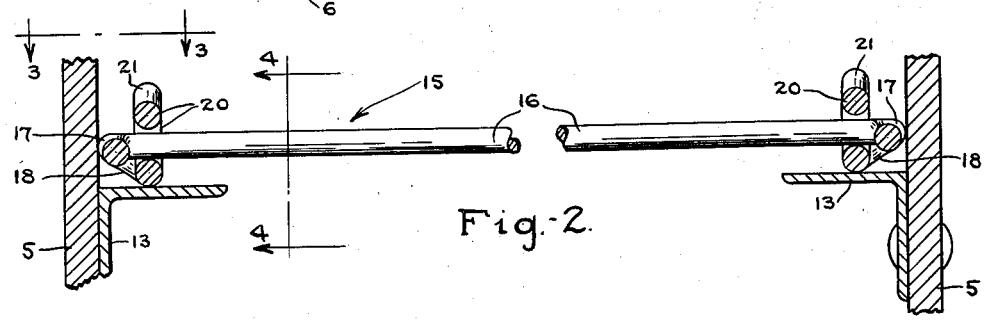
Fig. 2 is an enlarged detail cross section on the line 2—2 in Fig. 1, or as seen also on the irregular line 2—2 in Fig. 3.
Figure 3:
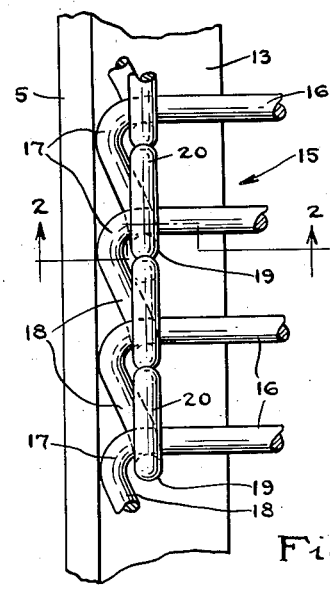
Fig. 3 is an enlarged detail plan view on the line 3—3 in Fig. 2.

Referring to the drawing more particularly and by reference characters, 5 designates the side walls of a conveyer frame, the same being shown as incorporated in a potato harvester having main support wheels 6, front wheels or truck 7, shovel 8, draft beam 9, and a pair of conveyer supporting rolls 10 and 11 mounted between opposite ends, respectively, of the wall boards 5, and the latter of which rollers is actuated by the ground wheels 6 through power transmitting mechanism 12. It is of course understood that the machine shown is purely illustrative of a type in which the invention may be used, and that the conveyer is equally applicable to other designs, conventional or otherwise, in which it may be desirable to embody my improvements and secure the advantages thereof already noted.

The rolls 10 and 11 are preferably toothed or notched to more accurately and positively engage the conveyer sections which move thereabout, but in any event are preferably supplemented by lateral flanges 13 carried by and extending inwardly from the side boards 5, to thus support the upper run of the conveyer, while an idler member 14 may be employed to partially support the relatively slack or under run of the conveyer, it being understood that the roller 11 will transmit the necessary power to the endless conveyer which is designated generally by the numeral 15.

The conveyer 15 is made up of interlinked or interlocked sections, all of which are similarly formed, and comprise single pieces of rod iron that are shown to be circular in cross section but may have other cross sectional formation, and in any event are preferably made from conventional stock material in the interest of cheapness in manufacture.

Each section comprises a cross rod 16 bent at both ends, as at 17, to form angular arm extensions 18, which arms in turn are bent upwardly, as shown at 19 (Fig. 4), into extensions 20, lying in planes perpendicular to the rods 16. The extensions 20 in turn terminate in hooks 21, by virtue of which the exposed ends 22 of the rod material are directed downwardly or toward the plane passing through the adjacent cross rods 16. Thus it will be seen that edges of the rod ends 22 are so arranged that they cannot possibly do any bruising damages to potatoes or similar products which will be carried by the conveyer laterally thereof or adjacent the side boards 5.

Figure 4:
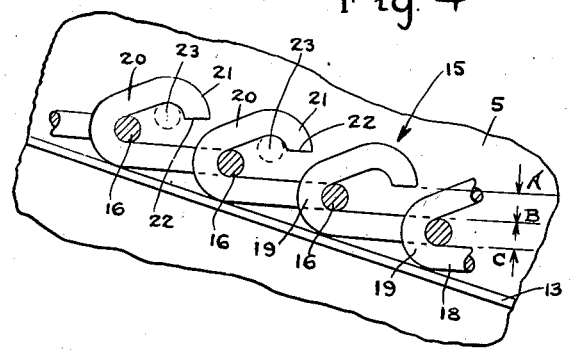
Fig. 4 is an enlarged detail section on the line 4—4 in either Fig. 2 or Fig. 3.

It will be seen that to accomplish this purpose it is not necessary to close the loops formed by parts 18—19—20—21, which would greatly interfere with section replacements, but that there is just sufficient vertical space between the rod ends 22 and the arm extensions 18 to permit the rod portion of the next section to be inserted and removed without bending or forcing of the metal parts. The clearance in question is illustrated in Fig. 4 wherein the space A—B will be noted as being slightly greater than the rod diameter indicated at B—C.

It will further be noted that by hooking the extensions 20, as at 21, I provide a recess 23 adapted to receive the cross rod 16 of the interlinked section when for instance a part of the conveyer 15 has a substantial amount of slack, and by so doing prevents, in at least the majority of instances, accidental disengagement of the sections with respect to each other.

It will be understood that the principal focus of wear is the point of contact by the cross rod 16 in the bearing curve 19, and when the wear at this point reaches the point of fracturing or substantially weakening the rod strength the section is replaced, and this replacement is quickly effected in the manner already noted.

It is further understood that suitable modifications may be made in the design and structural details of the device, as herein disclosed, without departing from the spirit and scope of the invention as hereinafter claimed. Having now disclosed my invention what I claim to be new and desire to protect by Letters Patent is:

1. An endless conveyer for a potato harvester or the like, comprising a series of interlinked, separable sections, each of which sections includes a cross bar bent adjacent opposed ends to form angular arms disposed in a common plane, said arms continuing in back bent extensions forming bearing recesses for engagement by the rod of the next adjacent section, said extensions being hooked to form additional rod recesses and with the end extremities of the rod directed toward and substantially perpendicular with respect to said plane.

2. An endless conveyer for a potato harvester or the like, comprising a series of interlinked, separable sections, each of which sections includes a cross bar bent adjacent opposed ends to form angular arms disposed in a common plane, said arms continuing in back bent extensions forming bearing recesses for engagement by the rod of the next adjacent section, said extensions being hooked to form additional rod recesses, and with the ends of the rod adjacent such hooks spaced vertically with respect to the arms sufficiently to permit the cross bar of the interlinked section to pass therethrough.

3. An endless conveyer for a potato harvester or the like, comprising a series of interlinked, separable sections, each of which sections includes a cross bar bent adjacent opposed ends to form angular arms disposed in a common plane, said arms continuing in back bent extensions forming bearing recesses for engagement by the rod of the next adjacent section, said extensions being hooked to form additional rod recesses, the end faces of the rod being disposed in spaced but substantially parallel relationship with the said plane of the arms.

4. A device of the character described comprising side walls with inwardly opposed support flanges, rollers between opposite ends of the walls, an endless conveyer supported on said rollers and flanges to carry potatoes or the like, said conveyer having openings for the discharge of foreign matter and being composed of spaced interlinked sections, each of which sections includes a rod having an angularly formed connecting arm at each end, each such arm having an extension terminating in a hook which is spaced sufficiently from the arm to permit ingress and egress of the next adjacent rod, and which hook prevents the end edges of the rod from coming into bruising contact with the potatoes or the like carried on the conveyer.

ARVID R. DE WAHL.